(12) United States Patent
Kurose et al.

(10) Patent No.: US 10,422,374 B2
(45) Date of Patent: Sep. 24, 2019

(54) SYNTHETIC RESIN-MADE SLIDING BEARING

(71) Applicant: OILES CORPORATION, Minato-ku, Tokyo (JP)

(72) Inventors: Kouhei Kurose, Fujisawa (JP); Katsunori Saito, Fujisawa (JP)

(73) Assignee: OILES CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/774,051

(22) PCT Filed: Nov. 17, 2016

(86) PCT No.: PCT/JP2016/084165
§ 371 (c)(1),
(2) Date: May 7, 2018

(87) PCT Pub. No.: WO2017/086401
PCT Pub. Date: May 26, 2017

(65) Prior Publication Data
US 2018/0328404 A1 Nov. 15, 2018

(30) Foreign Application Priority Data

Nov. 20, 2015 (JP) .................. 2015-228173

(51) Int. Cl.
*F16C 17/10* (2006.01)
*F16C 17/18* (2006.01)
(Continued)

(52) U.S. Cl.
CPC ............ *F16C 17/10* (2013.01); *B60G 15/068* (2013.01); *F16C 17/107* (2013.01); *F16C 17/18* (2013.01);
(Continued)

(58) Field of Classification Search
CPC .......... F16C 17/10; F16C 17/26; F16C 33/20; F16C 2326/05; F16C 2208/00;
(Continued)

(56) References Cited

U.S. PATENT DOCUMENTS 4,854,745 A * 8/1989 Kamimura ........... B60G 15/068
384/420
4,907,289 A 3/1990 Kamimura et al.
(Continued)

FOREIGN PATENT DOCUMENTS

CN 103906937 A 7/2014
CN 104995419 A 10/2015
(Continued)

OTHER PUBLICATIONS

International Search Report for PCT/JP2016/084165, dated Feb. 14, 2017, 6 pages.
(Continued)

*Primary Examiner* — Marcus Charles
(74) *Attorney, Agent, or Firm* — Nixon & Vanderhye P.C.

(57) ABSTRACT

A synthetic resin-made sliding bearing 1 includes a synthetic resin-made upper casing 3 having a cylindrical outer peripheral side surface 2; a synthetic resin-made lower casing 6 which has a cylindrical inner peripheral side surface 5 opposed to the outer peripheral side surface 2 in a radial direction A and defining in cooperation with the outer peripheral side surface 2 a cylindrical space 4 as a tubular space extending in a vertical direction B intersecting the radial direction A, and on which the upper casing 3 is mounted; a synthetic resin-made thrust sliding bearing 8 disposed in an annular space 7 between the upper casing 3 and the lower casing 6 in the vertical direction B; and a synthetic resin-made radial sliding bearing 9 disposed in the
(Continued)

space 4 with a radial inner clearance [=2·(a+b)] with respect to the upper casing 3 and the lower casing 6.

9 Claims, 4 Drawing Sheets

(51) Int. Cl.
*F16C 33/20* (2006.01)
*F16F 9/54* (2006.01)
*B60G 15/06* (2006.01)

(52) U.S. Cl.
CPC ............... *F16C 33/20* (2013.01); *F16F 9/54* (2013.01); *F16C 2208/00* (2013.01); *F16C 2326/05* (2013.01); *F16C 2361/53* (2013.01)

(58) Field of Classification Search
CPC .... F16C 17/107; F16C 17/18; F16C 2361/53; F16F 9/54; B60B 15/068; B60G 15/068
USPC ........ 384/125, 129, 368, 371, 420, 590, 121
See application file for complete search history.

(56) References Cited

U.S. PATENT DOCUMENTS

| | | | |
|---|---|---|---|
| 4,923,312 A | 5/1990 | Kamimura et al. | |
| 4,969,752 A | 11/1990 | Kubota et al. | |
| 5,476,326 A * | 12/1995 | Ueno | B60G 15/067 384/125 |
| 6,918,701 B2 * | 7/2005 | Ueno | F16C 17/10 384/125 |
| 8,066,435 B2 * | 11/2011 | Miyata | B60G 15/068 280/124.147 |
| 8,328,427 B2 * | 12/2012 | Kellam | B60G 15/068 384/144 |
| 8,684,607 B2 * | 4/2014 | Kaneko | B60G 15/068 384/420 |
| 8,998,497 B2 * | 4/2015 | Kaneko | B60G 15/068 384/420 |
| 2004/0028303 A1 | 2/2004 | Ueno et al. | |
| 2004/0135301 A1 | 7/2004 | Handke et al. | |
| 2010/0040317 A1 | 2/2010 | Kellam | |
| 2010/0104228 A1 | 4/2010 | Kaneko | |
| 2010/0202716 A1 * | 8/2010 | Kaneko | B60G 15/063 384/368 |
| 2013/0322798 A1 | 12/2013 | Morishige et al. | |
| 2014/0248009 A1 | 9/2014 | Morishige et al. | |
| 2014/0270609 A1 | 9/2014 | Morishige et al. | |
| 2015/0375591 A1 | 12/2015 | Sakairi et al. | |
| 2015/0377286 A1 | 12/2015 | Sakairi et al. | |

FOREIGN PATENT DOCUMENTS

| | | | |
|---|---|---|---|
| CN | 104995420 A | 10/2015 | |
| DE | 102 50 436 B3 | 4/2004 | |
| EP | 1 365 162 A1 | 11/2003 | |
| EP | 2 679 843 A1 | 1/2014 | |
| EP | 2 765 320 A1 | 8/2014 | |
| EP | 2775154 A4 * | 11/2015 | ............. F16C 33/74 |
| JP | 63-40621 U | 3/1988 | |
| JP | 63-40622 U | 3/1988 | |
| JP | 63-101325 U | 7/1988 | |
| JP | 63-101326 U | 7/1988 | |
| JP | 63-115916 U | 7/1988 | |
| JP | 63-115917 U | 7/1988 | |
| JP | 63-118421 U | 7/1988 | |
| JP | 2-107823 U | 8/1990 | |
| JP | 09-049529 | 2/1997 | |
| JP | 09072339 A * | 3/1997 | ............. F16C 17/04 |
| JP | 2001-027228 | 1/2001 | |
| JP | 2001027227 A * | 1/2001 | ............. F16C 17/10 |
| JP | 2002-257146 | 9/2002 | |
| JP | 2004-225754 | 8/2004 | |
| JP | 2008232304 A * | 10/2008 | ........... B60G 15/068 |
| JP | 2012-172814 A | 9/2012 | |
| JP | 2013-83303 A | 5/2013 | |
| JP | 2013-96534 A | 5/2013 | |
| JP | 2014-156907 A | 8/2014 | |
| JP | 2014-156908 A | 8/2014 | |
| WO | WO-02068835 A1 * | 9/2002 | ............. F16C 17/10 |
| WO | 2008/114514 | 9/2008 | |
| WO | WO 2012/114679 A1 | 8/2012 | |
| WO | WO 2013/051240 A1 | 4/2013 | |
| WO | 2013/065273 | 5/2013 | |
| WO | WO 2014/125788 A1 | 8/2014 | |
| WO | WO 2014/125792 A1 | 8/2014 | |

OTHER PUBLICATIONS

The First Office Action dated Mar. 4, 2019 in Chinese Application No. 201680067349.4, with English translation, 15 pages.

Extended European Search Report dated May 23, 2019 in European Application No. 16866402.7, 7 pages.

* cited by examiner

SYNTHETIC RESIN-MADE SLIDING BEARING

CROSS REFERENCE TO RELATED APPLICATIONS

This application is the U.S. national phase of International Application No. PCT/JP2016/084165 filed Nov. 17, 2016, which designated the U.S. and claims priority to JP Patent Application No. 2015-228173 filed Nov. 20, 2015, the entire contents of each of which are hereby incorporated by reference.

TECHNICAL FIELD

The present invention relates to a synthetic resin-made sliding bearing, and more particularly to a synthetic resin-made sliding bearing which is suitably incorporated as a sliding bearing of a strut-type suspension (Macpherson type) in a four-wheeled motor vehicle.

BACKGROUND ART

In general, among the strut-type suspensions used for front wheels of four-wheeled motor vehicles and having a structure in which a strut assembly incorporating a hydraulic shock absorber in an outer cylinder integrated with a main shaft is combined with a coil spring, there is a type in which when the strut assembly rotates together with the coil spring in the steering operation, the piston rod of the strut assembly rotates, and a type in which the piston rod does not rotate. In the strut-type suspension of either type, there are cases where, a bearing is used between a mounting member on the vehicle body and an upper spring seat of the coil spring, so as to allow smooth rotation of the strut assembly.

In this bearing, a rolling bearing using balls or needles or a synthetic resin-made sliding bearing is used. However, the rolling bearing has a possibility of causing a fatigue failure in the balls or needles owing to such as infinitesimal oscillations and a vibratory load, so that there is a problem in that it is difficult to maintain a smooth steering operation. Meanwhile, the sliding bearing has a high frictional torque as compared to the rolling bearing, and therefore has the possibility of making the steering operation heavy. Furthermore, both bearings have the problem that the steering operation is made heavy due to the high frictional force of a dust seal formed of a rubber elastomer fitted to prevent the ingress of foreign objects such as dust onto sliding surfaces, and the synthetic resin-made sliding bearing in particular has the problem that the steering operation is made much heavier.

PRIOR ART DOCUMENT

Patent Document

[Patent Document 1] JP-A-2004-225754

SUMMARY OF THE INVENTION

Problems that the Invention is to Solve

To overcome the above-described problems, a synthetic resin-made sliding bearing has been proposed which is comprised of a synthetic resin-made upper casing, a synthetic resin-made lower casing, and a synthetic resin-made thrust sliding bearing and a synthetic resin-made radial sliding bearing which are interposed between the upper casing and the lower casing, wherein sealing portions based on labyrinth action are formed on the radially inner side and the radially outer side to prevent the ingress of foreign objects such as dust onto sliding surfaces of the thrust sliding bearing and the radial sliding bearing by means of the sealing portions.

The sliding bearing including the upper casing, the lower casing, and the thrust sliding bearing and the radial sliding bearing which are respectively disposed in an annular space and a tubular space between the upper casing and the lower casing improves sliding characteristics such as low frictional property and wear resistance. However, in a case where a fluctuating load or the like is applied to such a sliding bearing in the radial direction and a displacement occurs to the lower casing in the radial direction owing to a radial inner clearance of the radial sliding bearing, surfaces which form a passage like a labyrinth allowing the ring-shaped space and the tubular space between the upper casing and the lower casing to communicate with the outside may possibly interfere with (press and contact) each other in the radial direction. As a result, there is a possibility that defects such as deformation, damage, and breakage may occur in these surfaces. Furthermore, in a case where relative sliding in the rotating direction (circumferential direction) occurs at the surfaces where interference has occurred, an increase in the frictional resistance may result, possibly lowering the sliding characteristics.

The present invention has been devised in view of the above-described aspects, and its object is to provide a synthetic resin-made sliding bearing which, even if a fluctuating load or the like is applied to the lower casing in the radial direction and a radial displacement occurs to the lower casing with respect to the upper casing owing to the radial inner clearance of the radial sliding bearing, is capable of avoiding interference attributable to mutual pressing and contacting in the radial direction between those surfaces of the upper casing and the lower casing that define clearances for forming a passage like a labyrinth allowing the ring-shaped space and the tubular space between the upper casing and the lower casing with the thrust bearing and the radial sliding bearing disposed respectively therein to communicate with the outside, and which does not cause defects such as deformation, damage, and breakage to occur in those surfaces and does not cause a decline in the sliding characteristics attributable to the relative sliding at those surfaces.

Means for Overcoming the Problems

A synthetic resin-made sliding bearing in accordance with the present invention comprises: a synthetic resin-made upper casing having a cylindrical side surface; a synthetic resin-made lower casing which has a cylindrical side surface defining in cooperation with the cylindrical side surface of the upper casing a tubular space extending in such a manner as to intersect a radial direction, and on which the upper casing is mounted; a synthetic resin-made thrust sliding bearing disposed in a ring-shaped space between the upper casing and the lower casing in a vertical direction; and a synthetic resin-made radial sliding bearing disposed in the tubular space with a radial inner clearance with respect to the upper casing and the lower casing, in an outer peripheral side clearance allowing a radially outer peripheral portion of the ring-shaped space to communicate with an outside of the synthetic resin-made sliding bearing and constituted by mutually opposing surfaces of the upper casing and the lower casing and an inner peripheral side clearance allowing a radially inner peripheral portion of the ring-shaped space to communicate with the outside of the synthetic resin-made sliding bearing and constituted by mutually opposing surfaces of the upper casing and the lower casing, a clearance extending in such a manner as to intersect the radial direction having a radial width which is equal to or greater than ½ of the radial inner clearance of the radial sliding bearing.

According to the synthetic resin-made sliding bearing in accordance with the present invention, in an outer peripheral side clearance allowing a radially outer peripheral portion of the ring-shaped space where the synthetic resin-made sliding bearing is disposed to communicate with an outside of the synthetic resin-made sliding bearing and constituted by mutually opposing surfaces of the upper casing and the lower casing and an inner peripheral side clearance allowing a radially inner peripheral portion of the ring-shaped space to communicate with the outside of the synthetic resin-made sliding bearing and constituted by mutually opposing surfaces of the upper casing and the lower casing, the radial width of a clearance extending in such a manner as to intersect the radial direction is equal to or greater than ½ of the radial inner clearance of the radial sliding bearing. In other words, that width is equal to or greater than the sum of a radial width of a clearance between the cylindrical side surface of the upper casing and one sliding side surface of the radial sliding bearing in the radial direction and a radial width of a clearance between the cylindrical side surface of the lower casing and the other sliding side surface of the radial sliding bearing in the radial direction. Therefore, in the event that a fluctuating load or the like is applied to the lower casing in the radial direction and a displacement of at most the radial inner clearance is caused in the lower casing with respect to the upper casing owing to the radial inner clearance of the radial sliding bearing, in other words, owing to the clearance of twice the sum of the radial width of the clearance between the cylindrical side surface of the upper casing and one sliding side surface of the radial sliding bearing in the radial direction and the radial width of the clearance between the cylindrical side surface of the lower casing and the other sliding side surface of the radial sliding bearing in the radial direction, it is possible to avoid interference attributable to the pressing and contacting in the radial direction between those mutually opposing surfaces of the upper casing and the lower casing that define the respective clearances extending in such a manner as to intersect the radial direction, so that defects such as deformation, damage, and breakage are not caused in those surfaces and a decline is not caused in the sliding characteristics attributable to the relative sliding at those surfaces.

In the synthetic resin-made sliding bearing in accordance with the present invention, the "outer peripheral side and inner peripheral side clearances" include a clearance constituted by surfaces of the upper casing and the lower casing opposing each other in the vertical direction, namely, a clearance extending in the radial direction, and a clearance constituted by surfaces of the upper casing and the lower casing opposing each other in the radial direction, namely, a clearance extending in such a manner as to intersect the radial direction.

In the synthetic resin-made sliding bearing in accordance with the present invention, the thrust sliding bearing disposed in the ring-shaped space between the upper casing and the lower casing may be formed integrally on one of the upper casing and the lower casing and may have a surface which is in slidable contact with the other one of the upper casing and the lower casing, or alternatively, may be formed separately from the upper casing and the lower casing and may have an upper surface which is in slidable contact with the upper casing and a lower surface which is in slidable contact with the lower casing. Similarly, the radial sliding bearing disposed in the tubular space between the upper casing and the lower casing may be formed integrally on one of the upper casing and the lower casing and may have a surface which is in slidable contact with the other one of the upper casing and the lower casing, or alternatively, may be formed separately from the upper casing and the lower casing and may have one sliding side surface which is in slidable contact with the upper casing and another sliding side surface which is in slidable contact with the lower casing. In the radial sliding bearing of the former case, the radial inner clearance thereof is twice the radial width of the clearance between the cylindrical side surface of the upper casing and the one sliding side surface of the radial sliding bearing in the radial direction or twice the radial width of the clearance between the cylindrical side surface of the lower casing and the other sliding side surface of the radial sliding bearing in the radial direction.

Further, in the synthetic resin-made sliding bearing in accordance with the present invention, at least one of the outer peripheral side clearance and the inner peripheral side clearance may be constituted by a single clearance extending in such a manner as to intersect the radial direction, or alternatively, by a plurality of clearances extending in such a manner as to intersect the radial direction so as to form a passage like a labyrinth.

In a preferred example of the synthetic resin-made sliding bearing in accordance with the present invention, the upper casing has a cylindrical upper casing suspended portion, and the cylindrical side surface of the upper casing is provided on the upper casing suspended portion, and wherein the lower casing has a cylindrical lower casing suspended portion and an inclined portion extending radially obliquely from the lower casing suspended portion, and the cylindrical side surface of the lower casing is provided on the lower casing suspended portion.

In a preferred example of the synthetic resin-made sliding bearing in accordance with the present invention in which the upper casing has the upper casing suspended portion and the lower casing has the lower casing suspended portion, the upper casing has a cylindrical lower end outer suspended portion provided on a radially outer side of a lower end surface of the upper casing suspended portion, and the lower casing has an annular lower end plate portion provided on a lower end of the lower casing inclined portion and a lower end projecting portion provided on an upper surface of the lower end plate portion. Further, the lower end projecting portion at an outer peripheral side surface thereof is opposed in the radial direction to an inner peripheral side surface of the lower end outer suspended portion with a lower end outer clearance extending in such a manner as to intersect the radial direction, and the lower end outer clearance has a radial width which is equal to or greater than ½ of the radial inner clearance of the radial sliding bearing.

In such a preferred example of the synthetic resin-made sliding bearing in accordance with the present invention, the upper casing further has a cylindrical lower end inner suspended portion provided on a radially inner side of the lower end surface of the upper casing suspended portion so as to form a ring-shaped groove in cooperation with the lower end outer suspended portion, and the lower end projecting portion is disposed in the ring-shaped groove such that an inner peripheral side surface thereof is opposed in the radial direction to an outer peripheral side surface of the lower end inner suspended portion with a lower end inner clearance extending in such a manner as to intersect the radial direction. Here, the lower end inner clearance has a radial width which is equal to or greater than ½ of the radial inner clearance of the radial sliding bearing.

In a preferred example, the upper casing suspended portion has a cylindrical different-diameter side surface having a different diameter than that of the cylindrical side surface and an upper annular flat surface connected continuously at one peripheral edge thereof to the cylindrical side surface of the upper casing and at another peripheral edge thereof to the different-diameter side surface, respectively, and the radial sliding bearing is opposed at the annular upper surface to the upper annular flat surface with a clearance therebetween so as to prevent upward movement of the radial sliding bearing through the contact of the annular upper surface with the upper annular flat surface. Further, the lower casing inclined portion has an annular inclined side surface and a lower annular flat surface connected continuously at one peripheral edge thereof to the inclined side surface and at another peripheral edge thereof to the cylindrical side surface of the lower casing, respectively, and the radial sliding bearing is, at the annular lower surface thereof, in slidable contact with the lower annular flat surface.

In the synthetic resin-made sliding bearing in accordance with the present invention, if such an upper annular flat surface and a lower annular flat surface are provided, it is possible to effect the positioning of the radial sliding bearing in the tubular space in the vertical direction, and prevent the displacement of the radial sliding bearing to outside the tubular space.

In a preferred example of the synthetic resin-made sliding bearing in accordance with the present invention, the upper casing has an annular upper plate portion having a lower surface, the lower casing has an annular lower plate portion having an upper surface defining the ring-shaped space in cooperation with the lower surface of the upper plate portion, and the thrust sliding bearing is, at the upper surface thereof, in slidable contact with the lower surface of the upper plate portion and, at the lower surface thereof, in slidable contact with the upper surface of the lower plate portion.

In a preferred example of the synthetic resin-made sliding bearing having the upper plate portion and the lower plate portion in accordance with the present invention, the lower casing further has an inner projecting portion provided on a radially inward side of the upper surface of the lower plate portion and an outer projecting portion provided on a radially outward side of the upper surface of the lower plate portion, and the thrust sliding bearing is disposed between the inner projecting portion and the outer projecting portion in the radial direction.

In the synthetic resin-made sliding bearing in accordance with the present invention, if the thrust sliding bearing is disposed between such an inner projecting portion and such an outer projecting lower portion, it is possible to effect the positioning of the thrust sliding bearing in the ring-shaped space in the radial direction, and prevent the displacement of the thrust sliding bearing to outside the ring-shaped space.

In one example of the synthetic resin-made sliding bearing in accordance with the present invention, the upper casing further has a through hole located in a center thereof in the radial direction and an inner peripheral side surface defining the through hole, and the upper casing at the inner peripheral side surface thereof defining the through hole is adapted to be immovably fixed in the radial direction to a shaft which is passed through the through hole.

In the above-described synthetic resin-made sliding bearing in accordance with the present invention, if, in the outer peripheral side clearance allowing the radially outer peripheral portion of the ring-shaped space to communicate with the outside of the synthetic resin-made sliding bearing and constituted by mutually opposing surfaces of the upper casing and the lower casing and the inner peripheral side clearance allowing the radially inner peripheral portion of the ring-shaped space to communicate with the outside of the synthetic resin-made sliding bearing and constituted by mutually opposing surfaces of the upper casing and the lower casing, a clearance extending in such a manner as to intersect the radial direction has a radial width which is equal to or greater than ½ of the radial inner clearance of the radial sliding bearing, it is possible to avoid interference attributable to the pressing and contacting in the radial direction between those surfaces of the upper casing and the lower casing that define the respective clearances extending in such a manner as to intersect the radial direction, so that defects such as deformation, damage, and breakage are not caused in those surfaces and a decline is not caused in the sliding characteristics attributable to the relative sliding at those surfaces. However, if the width of such a clearance extending in the intersecting manner is excessively large, the ingress of foreign objects such as dust onto the sliding surfaces of the thrust sliding bearing and the radial sliding bearing is facilitated, and therefore there is a possibility that it becomes impossible to obtain smooth steering operating force, with the result that it suffices if the maximum width of such a clearance extending in the intersecting manner is determined by taking into consideration a balance between the avoidance of interference and the prevention of ingress of foreign objects.

In the above-described synthetic resin-made sliding bearing, in the case where a plurality of clearances extending in such a manner as to intersect the radial direction are provided on the outer peripheral side so as to form a passage like a labyrinth on the outer peripheral side, and a plurality of clearances extending in such a manner as to intersect the radial direction are provided also on the inner peripheral side so as to form a passage like a labyrinth on the inner peripheral side as well, it is possible to effectively prevent the ingress of foreign objects such as dust from outside the synthetic resin-made sliding bearing into the ring-shaped space and the tubular space between the upper casing and the lower casing where the thrust sliding bearing and the radial sliding bearing are respectively disposed.

Advantages of the Invention

According to the present invention, it is possible to provide a synthetic resin-made sliding bearing which, even if a fluctuating load or the like is applied to the lower casing in the radial direction and a radial displacement occurs to the lower casing with respect to the upper casing owing to the radial inner clearance of the radial sliding bearing, is capable of avoiding interference attributable to mutual pressing and contacting in the radial direction between those surfaces of the upper casing and the lower casing that define clearances for forming a passage like a labyrinth allowing the ring-shaped space and the tubular space between the upper casing and the lower casing with the thrust bearing and the radial sliding bearing disposed respectively therein to communicate with the outside, and which does not cause defects such as deformation, damage, and breakage to occur in those surfaces and does not cause a decline in the sliding characteristics attributable to the relative sliding at those surfaces.

MODE FOR CARRYING OUT THE INVENTION

Hereafter, a detailed description will be given of the mode for carrying out the invention on the basis of the preferred embodiment illustrated in the drawings. It should be noted that the present invention is not limited to the embodiment.

In FIGS. 1 to 6, a synthetic resin-made sliding bearing 1 in accordance with this embodiment is comprised of a synthetic resin-made upper casing 3 having a cylindrical outer peripheral side surface 2 as a cylindrical side surface; a synthetic resin-made lower casing 6 which has a cylindrical inner peripheral side surface 5 as a cylindrical side surface opposed to the outer peripheral side surface 2 in a radial direction A and defining in cooperation with the outer peripheral side surface 2 a cylindrical space 4 as a tubular space extending in a vertical direction B intersecting the radial direction A, and on which the upper casing 3 is mounted; a synthetic resin-made thrust sliding bearing 8 disposed in an annular space 7 as a ring-shaped space between the upper casing 3 and the lower casing 6 in the vertical direction B; and a synthetic resin-made radial sliding bearing 9 disposed in the space 4 with a radial inner clearance [=2·(a+b)] with respect to the upper casing 3 and the lower casing 6.

Figure 3:
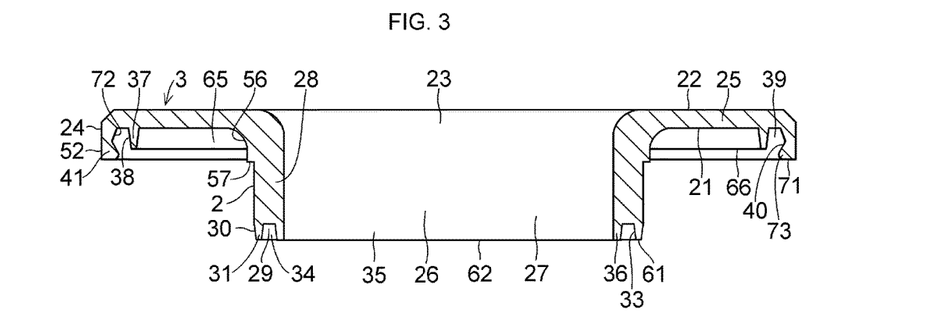
FIG. 3 is an explanatory cross-sectional view of an upper casing of the embodiment shown in FIG. 1.

The upper casing 3 includes an annular upper plate portion 25 having an annular lower surface 21 and an annular upper surface 22, as well as an inner peripheral side surface 23 and an outer peripheral side surface 24; a through hole 26 located in a center in the radial direction A; a cylindrical upper casing inner suspended portion 28 serving as a cylindrical upper casing suspended portion which is integrally provided on the lower surface 21 of the upper plate portion 25 on the inner side in the radial direction A of the lower surface 21 and has a cylindrical inner peripheral side surface 27; a lower end outer suspended portion 31 which is integrally provided on an annular lower end surface 29 of the upper casing inner suspended portion 28, provided with the outer peripheral side surface 2 in addition to the inner peripheral side surface 27, on the outer side in the radial direction A of the lower end surface 29, and which has a truncated conical surface-shaped outer peripheral side surface 30 connected continuously to the outer peripheral side surface 2; a cylindrical lower end inner suspended portion 36 which is integrally provided on the lower end surface 29 on the inner side in the radial direction A of the lower end surface 29, so as to form at a truncated conical surface-shaped outer peripheral side surface 32 thereof a circular annular groove 34 in cooperation with the lower end surface 29 and a truncated conical surface-shaped inner peripheral side surface 33 of the lower end outer suspended portion 31, and which has a cylindrical inner peripheral side surface 35 flush with the inner peripheral side surface 27; a cylindrical outer suspended portion 37 provided integrally on the lower surface 21 on the outer side in the radial direction A of the lower surface 21; and an annular engaging suspended portion 41 which has an inner peripheral side surface 40 for forming an annular upper outer ring-shaped groove 39 in cooperation with the lower surface 21 and a truncated conical surface-shaped outer peripheral side surface 38 of the outer suspended portion 37, and which is integrally provided on the lower surface 21 on the outer side in the radial direction A of the outer suspended portion 37.

The inner peripheral side surface 23 constituted by a circular arc-shaped convex surface is continuously connected at one annular end thereof to the upper surface 22 and at another annular end thereof to the inner peripheral side surface 27, respectively. The outer peripheral side surface 24 includes an inclined surface 51 connected continuously to the upper surface 22 at one annular end thereof and a cylindrical outer peripheral side surface 53 which is connected continuously at one annular end thereof to the inclined surface 51 and at another annular end thereof to a cylindrical outer peripheral side surface 52 of the engaging suspended portion 41, respectively. The upper casing inner suspended portion 28 includes, in addition to the outer peripheral side surface 2, an outer peripheral side surface 55 having a larger diameter than that of the outer peripheral side surface 2 and serving as a cylindrical different-diameter side surface having a different diameter than that of the outer peripheral side surface 2, a curved outer peripheral side surface 56 constituted by a circular arc-shaped concave surface and connected continuously at one annular peripheral edge thereof to the outer peripheral side surface 55 and at another annular peripheral edge thereof to the lower surface 21, respectively, and an upper annular flat surface 57 connected continuously at an annular inner peripheral edge thereof, i.e., one peripheral edge thereof, to the outer peripheral side surface 2 and at an annular outer peripheral edge thereof, i.e., another peripheral edge thereof, to the outer peripheral side surface 55, respectively. The through hole 26 is defined by the inner peripheral side surface 23, the inner peripheral side surface 27, and the inner peripheral side surface 35.

The lower end outer suspended portion 31 has, in addition to the outer peripheral side surface 30 and the inner peripheral side surface 33, an annular lower end surface 61 connected continuously to the outer peripheral side surface 30 and the inner peripheral side surface 33, respectively, and the lower end inner suspended portion 36 has, in addition to the outer peripheral side surface 32 and the inner peripheral side surface 35, an annular lower end surface 62 connected continuously to the outer peripheral side surface 32 and the inner peripheral side surface 35, respectively, and flush with the lower end surface 61.

The outer suspended portion 37 disposed in such a manner as to be spaced apart from the upper casing inner suspended portion 28 outwardly in the radial direction A has, in addition to the outer peripheral side surface 38, a truncated conical surface-shaped inner peripheral side surface 65 and an annular lower surface 66 connected continuously to the outer peripheral side surface 38 and the inner peripheral side surface 65, respectively.

The engaging suspended portion 41, which is integrally provided on the lower surface 21 on the outermost side in the radial direction A of the lower surface 21 in such a manner as to be spaced apart from the outer suspended portion 37 outwardly in the radial direction A, has, in addition to the cylindrical outer peripheral side surface 52 flush with and connected continuously to the outer peripheral side surface 53, an annular lower surface 71 connected continuously to the outer peripheral side surface 52. The inner peripheral side surface 40 has a truncated conical surface 72 connected continuously to the lower surface 21 and a cylindrical inwardly bulged engaging surface 73 connected continuously to the truncated conical surface 72 and the lower surface 71, respectively, and bulging inwardly in the radial direction A.

Figure 4:
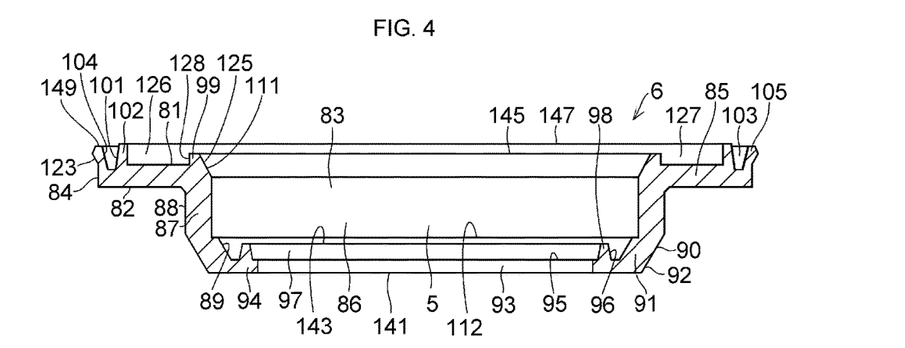
FIG. 4 is an explanatory cross-sectional view of a lower casing of the embodiment shown in FIG. 1.

The lower casing 6 includes an annular lower plate portion 85 having an annular upper surface 81, an annular lower surface 82, an inner peripheral side surface 83 and a cylindrical outer peripheral side surface 84; a cylindrical lower casing inner suspended portion 87 serving as a lower casing suspended portion which is provided integrally on the lower surface 82 on the inner side in the radial direction A of the lower surface 82 and has a cylindrical inner peripheral side surface 86; an annular lower casing inner inclined portion 91 serving as a lower casing inclined portion which is provided integrally on a lower end of the lower casing inner suspended portion 87 in such a manner as to extend obliquely inwardly in the radial direction A from the lower end of the lower casing inner suspended portion 87 having a cylindrical outer peripheral side surface 88 in addition to the inner peripheral side surface 86 and has an inclined outer peripheral side surface 90 in addition to an inclined inner peripheral side surface 89 serving as an annular inclined side surface; an annular lower end plate portion 94 provided integrally on a lower end of the lower casing inner inclined portion 91 and having a cylindrical inner peripheral side surface 93 and an inclined outer peripheral side surface 92 flush with the inclined outer peripheral side surface 90; a lower end projecting portion 98 provided integrally on an annular upper surface 95 of the lower end plate portion 94 and having a truncated conical surface-shaped outer peripheral side surface 96 and an inner peripheral side surface 97; an inner projecting portion 99 provided integrally on the upper surface 81 on the inner side in the radial direction A of the upper surface 81; a cylindrical outer projecting portion 102 provided integrally on the upper surface 81 on the outer side in the radial direction A of the upper surface 81 and having a truncated conical surface-shaped outer peripheral side surface 101 opposed to the inner peripheral side surface 65 in the radial direction A; and a cylindrical engaging projecting portion 105 having a truncated conical surface-shaped inner peripheral side surface 104 for forming an annular lower outer groove 103 in cooperation with the upper surface 81 and the outer peripheral side surface 101 and provided integrally on the upper surface 81 outwardly in the radial direction A of the outer projecting portion 102.

Thus, in the inner peripheral side surface 5 having the inner peripheral side surface 83 and the inner peripheral side surface 86 which are of the same diameter and flush with each other, the inner peripheral side surface 83 is provided on the lower plate portion 85, and the inner peripheral side surface 86 is provided on the lower casing inner suspended portion 87.

Figure 1:
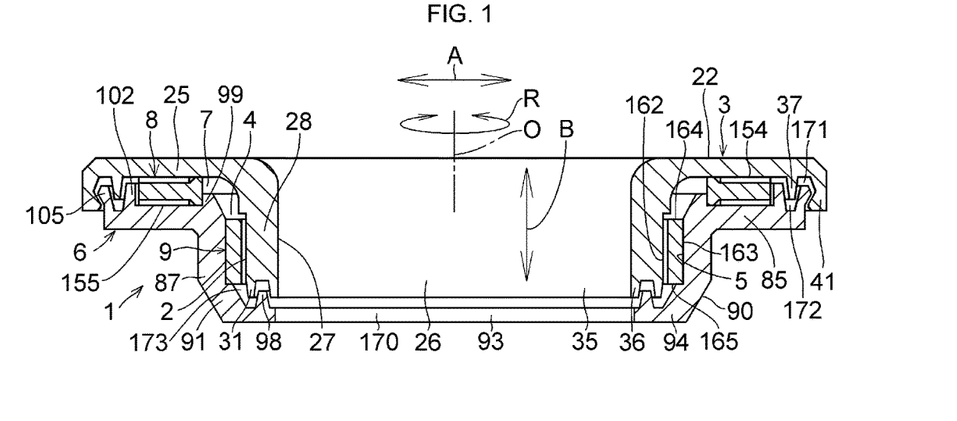
FIG. 1 is an explanatory cross-sectional view of a preferred embodiment of the invention.
Figure 2:
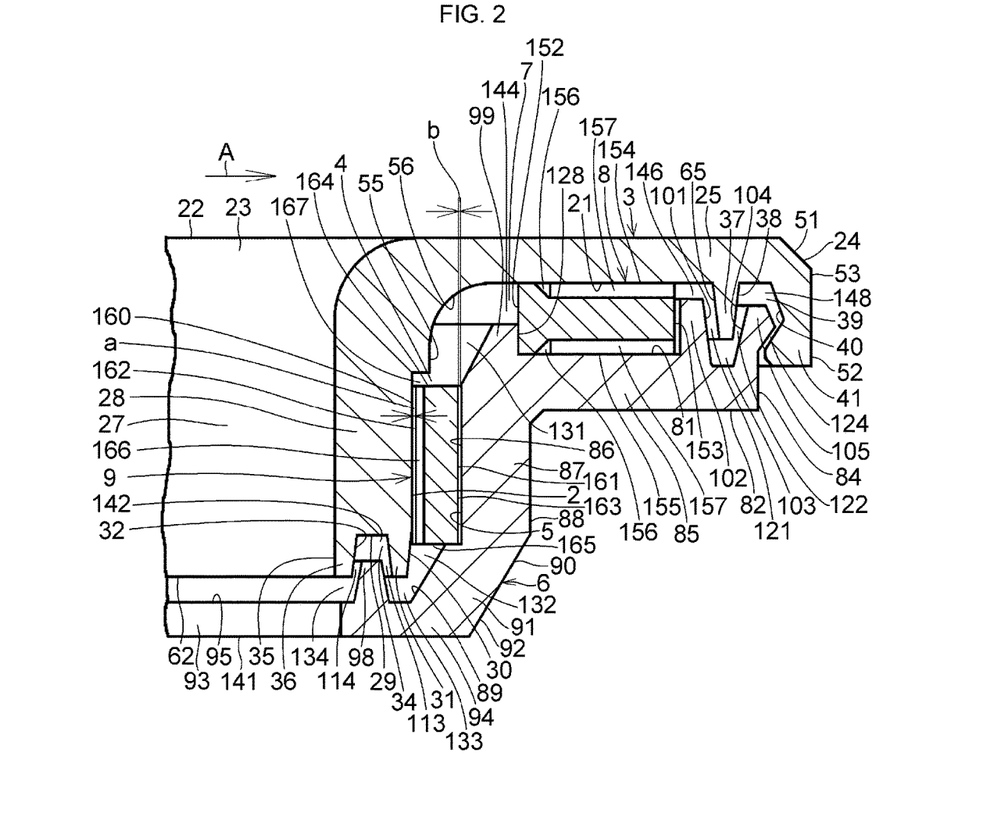
FIG. 2 is an explanatory partially enlarged cross-sectional view in the embodiment shown in FIG. 1.

The lower plate portion 85 having the upper surface 81 defining the space 7 in cooperation with the lower surface 21 further has, in addition to the inner peripheral side surface 83, an annular inclined inner peripheral side surface 111 which is continuously connected to the inner peripheral side surface 83 and extends from the inner peripheral side surface 83 in such a manner as to be inclined outwardly in the radial direction A. The lower casing inner inclined portion 91 further has a lower annular flat surface 112 connected continuously at one peripheral edge thereof to the inclined inner peripheral side surface 89 and at another peripheral edge thereof to the inner peripheral side surface 86, respectively. The lower end projecting portion 98 is disposed in the annular groove 34 such that the outer peripheral side surface 96 thereof opposes the inner peripheral side surface 33 in the radial direction A with a lower end outer clearance 113 and the inner peripheral side surface 97 thereof opposes the outer peripheral side surface 32 in the radial direction A with a lower end inner clearance 114. The outer suspended portion 37 is disposed in the lower outer groove 103 with a clearance 121 in the radial direction A between the inner peripheral side surface 65 and the outer peripheral side surface 101 opposed to each other in the radial direction A and with a clearance 122 in the radial direction A between the outer peripheral side surface 38 and the inner peripheral side surface 104 opposed to each other in the radial direction A. The engaging projecting portion 105 is disposed in the upper outer ring-shaped groove 39 with a clearance 124 serving as an engaging clearance in the radial direction A between the inner peripheral side surface 40 and an outer peripheral side surface 123 constituted by an outwardly bulged engaging surface thereof, which are opposed to each other in the radial direction A. The inner projecting portion 99 has an annular inner peripheral side surface 125 connected continuously to the inner peripheral side surface 111 and extending from the inner peripheral side surface 111 in such a manner as to be inclined outwardly in the radial direction A and a cylindrical outer peripheral side surface 128 for forming a ring-shaped groove 127 in cooperation with the upper surface 81 and a cylindrical inner peripheral side surface 126 of the outer projecting portion 102. The outer peripheral side surface 123 has a maximum diameter which is greater than a minimum diameter of the inwardly bulged engaging surface 73. By virtue of such relationship between the maximum diameter of the outer peripheral side surface 123 and the minimum diameter of the inwardly bulged engaging surface 73, the upper casing 3 is mounted on and combined with the lower casing 6 with the clearance 124 through snap-fit type resilient engagement between the lower casing 6 and the upper casing 3, i.e., between the engaging suspended portion 41 and the engaging projecting portion 105 at the inwardly bulged engaging surface 73 and the outer peripheral side surface 123. Meanwhile, engagement of the outer peripheral side surface 123 with the inwardly bulged engaging surface 73 occurs in the relative movement of the lower casing 6 away from the upper casing 3 in the vertical direction B, so that complete separation of the lower casing 6 from the upper casing 3 is prevented. More specifically, the fall-off of the lower casing 6 from the upper casing 3 is prevented, thereby allowing the combination of the lower casing 6 and the upper casing 3 to be maintained.

The outer peripheral side surface 55 and the curved outer peripheral side surface 56 form an annular clearance 131 in the radial direction A in cooperation with the inner peripheral side surfaces 111 and 125 which are opposed thereto obliquely downwardly in the radial direction A. The outer peripheral side surface 30 forms an annular clearance 132 in the radial direction A, which communicates with the space 4, in cooperation with the inclined inner peripheral side surface 89 opposed thereto in the radial direction A. The lower end surface 61 forms an annular clearance 133 in the vertical direction B communicating on one side with the clearance 113 and on the other side with the clearance 132, respectively, in cooperation with the upper surface 95 opposed thereto in the vertical direction B. The lower end surface 62 forms an annular clearance 134 in the vertical direction B, which on one side communicates with the clearance 114 and is open on the other side to the outside, in cooperation with the upper surface 95 opposed thereto in the vertical direction B.

The lower end plate portion 94 has an annular lower surface 141; the lower end projecting portion 98 has an annular upper end surface 143 for forming an annular clearance 142 in the vertical direction B with respect to the lower end surface 29; the inner projecting portion 99 has an annular upper end surface 145 for forming an annular clearance 144 in the vertical direction B with respect to the lower surface 21; the outer projecting portion 102 has an annular upper end surface 147 which forms an annular clearance 146 in the vertical direction B with respect to the lower surface 21 and is located higher than the upper end surface 145; and the engaging projecting portion 105 has an annular upper end surface 149 for forming an annular clearance 148 in the vertical direction B with respect to the lower surface 21.

Figure 5:
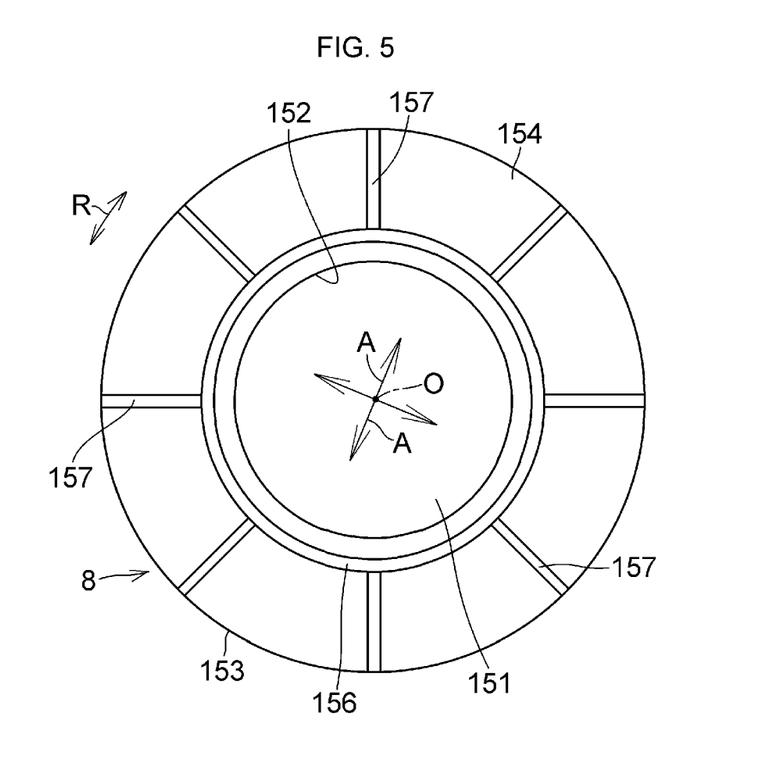
FIG. 5 is an explanatory plane view of a thrust sliding bearing of the embodiment shown in FIG. 1.

The annular thrust sliding bearing 8, which is disposed in the ring-shaped groove 127 in the space 7 located between the lower surface 21 and the upper surface 81 in the vertical direction B and is formed separately from the upper casing 3 and the lower casing 6, includes a cylindrical inner peripheral side surface 152 defining a central circular hole 151 and brought into slidable contact with the outer peripheral side surface 128 in a circumferential direction R about an axis O; a cylindrical outer peripheral side surface 153 having a diameter smaller than the diameter of the inner peripheral side surface 126 so as to oppose the inner peripheral side surface 126 with a clearance therebetween; an annular upper surface 154 serving as an upper annular thrust sliding bearing surface in the vertical direction B; an annular lower surface 155 serving as a lower annular thrust sliding bearing surface in the vertical direction B; ring-shaped grooves 156 which are provided in the upper surface 154 and the lower surface 155 in such a manner as to surround the circular hole 151, and in which a lubricant such as grease is filled; and a plurality of radial grooves 157 whose one ends are open to the ring-shaped groove 156 and other ends are open at the outer peripheral side surface 153, and which are arranged at equal intervals in the circumferential direction R, a lubricant such as grease being filled in these radial grooves 157 where are provided in the upper surface 154 and the lower surface 155. This annular thrust sliding bearing 8 is disposed between the inner projecting portion 99 and the outer projecting portion 102 in the radial direction such that the upper surface 154 thereof is brought slidably in the circumferential direction R into contact with the lower surface 21, while the lower surface 155 thereof is brought slidably in the circumferential direction R into contact with the upper surface 81 defining the bottom surface of the ring-shaped groove 127.

Figure 6:
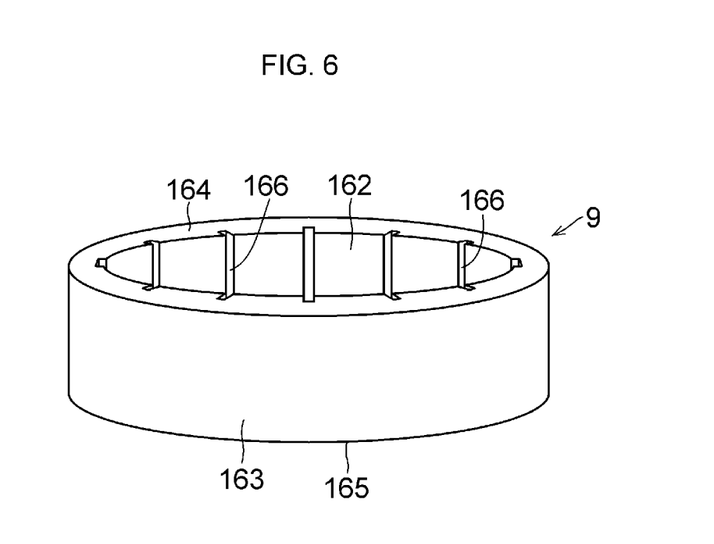
FIG. 6 is an explanatory perspective view of a radial sliding bearing of the embodiment shown in FIG. 1.

The radial sliding bearing 9 is disposed in the space 4 with both a cylindrical clearance 160 of a width a in the radial direction A with respect to the outer peripheral side surface 2 and a cylindrical clearance 161 of a width b in the radial direction A with respect to the inner peripheral side surface 5 having the inner peripheral side surface 83 and the inner peripheral side surface 86 which are of the same diameter and flush with each other, i.e., with a radial inner clearance $[=2 \cdot (a+b)]$ which is twice the sum of the width a and the width b. Such a radial sliding bearing 9 includes an inner peripheral surface 162 serving as one cylindrical sliding side surface which is opposed to the outer peripheral side surface 2 with the clearance 160 therebetween and is freely brought into contact with the outer peripheral side surface 2 slidably in the circumferential direction R; an outer peripheral surface 163 serving as another cylindrical sliding side surface which is opposed to the inner peripheral side surface 5 with the clearance 161 therebetween and is freely brought into contact with the inner peripheral side surface 5 slidably in the circumferential direction R; a circular annular upper surface 164 and a circular annular lower surface 165 which are respectively connected continuously to the inner peripheral surface 162 and the outer peripheral surface 163; and a plurality of vertical grooves 166 which are provided in the inner peripheral surface 162 and arranged at equal intervals in the circumferential direction R, and whose one ends are open at the annular upper surface 164 and other ends are open at the annular lower surface 165, a lubricant such as grease being filled in these vertical grooves 166. Such a radial sliding bearing 9 is opposed at the annular upper surface 164 to the upper annular flat surface 57 with a clearance 167 in the vertical direction B therebetween so as to prevent upward movement of the radial sliding bearing 9 by more than a fixed amount through the contact of the annular upper surface 164 with the upper annular flat surface 57, and is, at the annular lower surface 165, in contact with the lower annular flat surface 112 slidably in the radial direction A and the circumferential direction R.

The inner peripheral side surface 93 defines a through hole 170 which communicates with the through hole 26 and has a diameter which sufficiently exceeds a value obtained by adding twice the sum of the width a and the width b to the diameter of the through hole 26.

The synthetic resin-made sliding bearing 1 is formed as the upper casing 3 is mounted on the lower casing 6 with the thrust sliding bearing 8 disposed in the space 7 and with the radial sliding bearing 9 disposed in the space 4, through the fitting of the engaging suspended portion 41 with the engaging projecting portion 105 on the basis of flexural deformation for overcoming the diametrical difference, by means of an outer peripheral side clearance 171 which is constituted by the space between mutually opposing surfaces of the upper casing 3 and the lower casing 6 and allows the outer peripheral portion in the radial direction A of the space 7 to communicate with the outside of the synthetic resin-made sliding bearing 1, i.e., the outside of an interposed space between the upper casing 3 and the lower casing 6, and by means of an inner peripheral side clearance 173 which is constituted by the space between mutually opposing surfaces of the upper casing 3 and the lower casing 6 and allows the inner peripheral portion in the radial direction A of the space 7 to communicate with the outside of the synthetic resin-made sliding bearing 1 through the space 4. Specifically, the clearance 171 includes the clearance 146 communicating with a radially outer peripheral portion of the space 7; the clearance 121 communicating with the clearance 146; the annular clearance 172 communicating with the clearance 121 and constituted by the space between the mutually opposing lower surface 66 and the upper surface 81; the clearance 122 communicating with the clearance 172; the clearance 148 communicating with the clearance 122; and the clearance 124 which communicates with the clearance 148 and is open to outside the synthetic resin-made sliding bearing 1. Meanwhile, the clearance 173 includes the clearance 144 which communicates with the radially inner peripheral portion of the space 7; the clearance 131 which communicates, on one side, with the clearance 144 and, on the other side, with the clearances 160 and 161 in the space 4, respectively; the clearance 132 communicating with the clearance 160 and with the clearance 161 when the radial sliding bearing 9 is lifted up from the lower annular flat surface 112; the clearance 133 communicating with the clearance 132; the clearance 113 communicating with the clearance 133; the clearance 142 communicating with the clearance 113; the clearance 114 communicating with the clearance 142; and the clearance 134 communicating with the clearance 114.

In such a synthetic resin-made sliding bearing 1, each of the clearances 121, 122, 124, 131, 132, 113, and 114 which extend in such a manner as to intersect the radial direction A in the clearance 171 and the clearance 173 has a width in the radial direction A which is equal to or greater than ½ of the radial inner clearance [=2·(a+b)], namely, equal to or greater than the sum of the width a and the width b. Here, the width a is ½ of the difference between the diameter of the inner peripheral surface 162 and the diameter of the outer peripheral side surface 2, while the width b is ½ of the difference between the diameter of the inner peripheral side surface 5 and the diameter of the outer peripheral surface 163.

Figure 7:
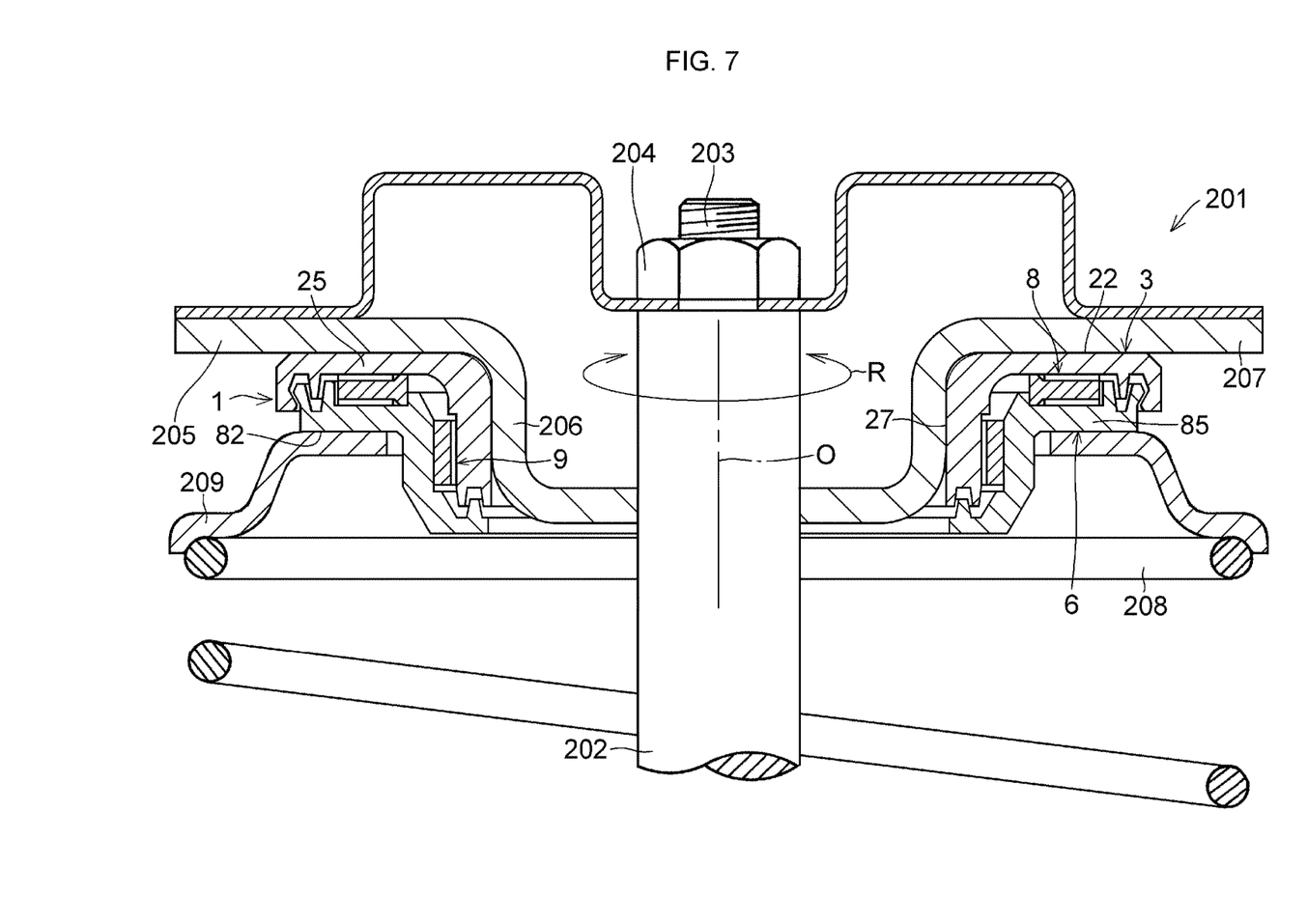
FIG. 7 is an explanatory cross-sectional view of an example in which the embodiment shown in FIG. 1 is incorporated in a strut-type suspension.

In a strut assembly 201 shown in FIG. 7, the above-described synthetic resin-made sliding bearing 1 is disposed between a vehicle body-side mounting member 205 and an upper spring seat 209 as a hollow cylindrical portion 206 of the vehicle body-side mounting member 205, which is mounted through a nut 204 or the like on one end portion 203 of a piston rod 202 serving as a shaft, is fitted into the through holes 26 and 170 in close contact with the inner peripheral side surface 27 without a gap, such that a flat plate portion 207 of the vehicle body-side mounting member 205 is brought into close contact with the upper surface 22 of the upper plate portion 25 without a gap, and the upper spring seat 209 receiving one end of a coil spring 208 is brought into close contact with the lower surface 82 of the lower plate portion 85 without a gap.

With the above-described synthetic resin-made sliding bearing 1, which is disposed between the vehicle body-side mounting member 205 and the upper spring seat 209 and in which the upper casing 3 at the inner peripheral side surfaces 27 and 35 defining the through hole 26 is fixed immovably in the radial direction A to the piston rod 202 which is passed through the through holes 26 and 170, since the radial sliding bearing 9 and the thrust sliding bearing 8 are respectively disposed in the spaces 4 and 7 between the lower casing 6 and the upper casing 3 mounted on the lower casing 6, the rotation in the circumferential direction R, i.e., the rotating direction about the axis O, of the upper spring seat 209 with respect to the vehicle body-side mounting member 205 in the steering operation is effected through at least one of the rotational sliding in the circumferential direction R of the thrust sliding bearing 8 at the upper surface 154 thereof with respect to the lower surface 21 and the rotational sliding in the circumferential direction R of the thrust sliding bearing 8 at the lower surface 155 thereof with respect to the upper surface 81, as well as through at least one of the rotational sliding in the circumferential direction R of inner peripheral surface 162 of the radial sliding bearing 9 with respect to the outer peripheral side surface 2 and the rotational sliding in the circumferential direction R of the outer peripheral surface 163 of the radial sliding bearing 9 with respect to the inner peripheral side surface 5, or, in this example and normally in most cases, through the rotation in the circumferential direction R of inner peripheral surface 162 of the radial sliding bearing 9 with respect to the outer peripheral side surface 2 under the presence of a lubricant layer in the clearances 160. As a result, smooth steering operation can be obtained. Moreover, since each of the clearances 121, 122, 124, 131, 132, 113, and 114 which extend in such a manner as to intersect the radial direction A in the clearance 171 and the clearance 173 has a width in the radial direction A which is equal to or greater than ½ of the radial inner clearance [=2·(a+b)], namely, equal to or greater than the sum of the width a and the width b, even if a fluctuating load or the like is applied to the lower casing 6 in the radial direction A owing to the radial inner clearance [=2·(a+b)] of the radial sliding bearing 9, namely, owing to the clearance 160 of the width 2×a on both sides in the radial direction A and the clearance 161 of the width 2×b on both sides in the radial direction A, and a displacement of at most the radial inner clearance [=2·(a+b)] occurs to the lower casing 6 with respect to the upper casing 3, it is possible to avoid each interference ascribable to the mutual pressing and contacting in the radial direction A between the inner peripheral side surface 65 and the outer peripheral side surface 101, the mutual pressing and contacting in the radial direction A between the inner peripheral side surface 104 and the outer peripheral side surface 38, the mutual pressing and contacting in the radial direction A between the inner peripheral side surface 40 and the outer peripheral side surface 123, the mutual pressing and contacting in the radial direction A between the outer peripheral side surface 55 and the inner peripheral side surfaces 111 and 125, the mutual pressing and contacting in the radial direction A between the outer peripheral side surface 30 and the inclined inner peripheral side surface 89, the mutual pressing and contacting in the radial direction A between the outer peripheral side surface 96 and the inner peripheral side surface 33, and the mutual pressing and contacting in the radial direction A between the outer peripheral side surface 32 and the inner peripheral side surface 97, which sets of surfaces respectively define the clearances 121, 122, 124, 131, 132, 113, and 114 extending in such a manner as to intersect the radial direction A. As a result, even if a relative displacement of at most the radial inner clearance [=2·(a+b)] in the radial direction A occurs to the lower casing 6 with respect to the upper casing 3, defects such as deformation, damage, and breakage are not caused in the upper casing 3 and the lower casing 6 at these outer peripheral side surfaces and inner peripheral side surfaces. Moreover, an increase in frictional resistance ascribable to such interference does not occur in the relative rotation in the circumferential direction R of the lower casing 6 with respect to the upper casing 3, thereby making it possible to maintain smooth steering operation.

Namely, with the synthetic resin-made sliding bearing 1, it is possible to avoid the mutual pressing and contacting in the radial direction A between the inner peripheral side surface 65 and the outer peripheral side surface 101, the mutual pressing and contacting in the radial direction A between the inner peripheral side surface 104 and the outer peripheral side surface 38, the mutual pressing and contacting in the radial direction A between the inner peripheral side surface 40 and the outer peripheral side surface 123, the mutual pressing and contacting in the radial direction A between the outer peripheral side surface 55 and the inner peripheral side surfaces 111 and 125, the mutual pressing and contacting in the radial direction A between the outer peripheral side surface 30 and the inclined inner peripheral side surface 89, the mutual pressing and contacting in the radial direction A between the outer peripheral side surface 96 and the inner peripheral side surface 33, and the mutual pressing and contacting in the radial direction A between the outer peripheral side surface 32 and the inner peripheral side surface 97, which are ascribable to the radial inner clearance [=2·(a+b)] required for the fitting of the radial sliding bearing 9 in the space 4, so that smooth steering operation can be ensured.

DESCRIPTION OF REFERENCE NUMERALS

1: synthetic resin-made sliding bearing
2: outer peripheral side surface
3: upper casing
4, 7: space
5: inner peripheral side surface
6: lower casing
8: thrust sliding bearing
9: radial sliding bearing

The invention claimed is:

1. A synthetic resin-made sliding bearing comprising:
a synthetic resin-made upper casing having a cylindrical side surface;
a synthetic resin-made lower casing which has a cylindrical side surface defining in cooperation with the cylindrical side surface of said upper casing a tubular space extending so as to intersect a radial direction, and on which said upper casing is mounted;
a synthetic resin-made thrust sliding bearing disposed in a ring-shaped space between said upper casing and said lower casing in a vertical direction; and
a synthetic resin-made radial sliding bearing disposed in the tubular space with a radial inner clearance with respect to said upper casing and said lower casing,
said radial sliding bearing including an inner peripheral surface which is opposed to the cylindrical side surface of said upper casing with a first clearance and an outer peripheral surface which is opposed to the cylindrical side surface of said lower casing with a second clearance,
said radial inner clearance having the first clearance and the second clearance,
in an outer peripheral side clearance allowing a radially outer peripheral portion of the ring-shaped space to communicate with an outside of the synthetic resin-made sliding bearing and constituted by mutually opposing surfaces of said upper casing and said lower casing and an inner peripheral side clearance allowing a radially inner peripheral portion of the ring-shaped space to communicate with the outside of the synthetic resin-made sliding bearing and constituted by mutually opposing surfaces of said upper casing and said lower casing, a clearance extending so as to intersect the radial direction having a radial width which is equal to or greater than ½ of the radial inner clearance of said radial sliding bearing.

2. The synthetic resin-made sliding bearing according to claim 1, wherein said upper casing has a cylindrical upper casing suspended portion, and the cylindrical side surface of said upper casing is provided on the upper casing suspended portion, and wherein said lower casing has a cylindrical lower casing suspended portion and a lower casing inclined portion extending radially obliquely from a lower end surface of the lower casing suspended portion, and the cylindrical side surface of said lower casing is provided on the lower casing suspended portion.

3. The synthetic resin-made sliding bearing according to claim 2, wherein said upper casing has a lower end outer suspended portion provided on a radially outer side of a lower end surface of the upper casing suspended portion, and said lower casing has an annular lower end plate portion provided on a lower end of the lower casing inclined portion and a lower end projecting portion provided on an upper surface of the lower end plate portion,
the lower end projecting portion at an outer peripheral side surface thereof being opposed in the radial direction to an inner peripheral side surface of the lower end outer suspended portion with a lower end outer clearance extending so as to intersect the radial direction, and
wherein the lower end outer clearance has a radial width which is equal to or greater than ½ of the radial inner clearance of said radial sliding bearing.

4. The synthetic resin-made sliding bearing according to claim 3, wherein said upper casing further has a cylindrical lower end inner suspended portion provided on a radially inner side of the lower end surface of the upper casing suspended portion so as to form a ring-shaped groove in cooperation with the lower end outer suspended portion, and the lower end projecting portion is disposed in the ring-shaped groove such that an inner peripheral side surface thereof is opposed in the radial direction to an outer peripheral side surface of the lower end inner suspended portion with a lower end inner clearance extending so as to intersect the radial direction, and
wherein the lower end inner clearance has a radial width which is equal to or greater than ½ of the radial inner clearance of said radial sliding bearing.

5. The synthetic resin-made sliding bearing according to claim 2, wherein said upper casing suspended portion has a cylindrical different-diameter side surface having a different diameter than that of the cylindrical side surface and an upper annular flat surface connected continuously at one peripheral edge thereof to the cylindrical side surface of said upper casing and at another peripheral edge thereof to the different-diameter side surface, respectively, and said radial sliding bearing is opposed at the annular upper surface to the upper annular flat surface with a clearance therebetween so as to prevent upward movement of said radial sliding bearing through the contact of the annular upper surface with the upper annular flat surface.

6. The synthetic resin-made sliding bearing according to claim 2, wherein the lower casing inclined portion has an annular inclined side surface and a lower annular flat surface connected continuously at one peripheral edge thereof to the inclined side surface and at another peripheral edge thereof to the cylindrical side surface of said lower casing, respectively, and said radial sliding bearing is, at the annular lower surface thereof, in slidable contact with the lower annular flat surface.

7. The synthetic resin-made sliding bearing according to claim 1, wherein said upper casing has an annular upper plate portion having a lower surface, said lower casing has an annular lower plate portion having an upper surface defining the ring-shaped space in cooperation with the lower surface of the upper plate portion, and said thrust sliding bearing is, at the upper surface thereof, in slidable contact with the lower surface of the upper plate portion and, at the lower surface thereof, in slidable contact with the upper surface of the lower plate portion.

8. The synthetic resin-made sliding bearing according to claim 7, wherein said lower casing further has an inner projecting portion provided on a radially inward side of the upper surface of the lower plate portion and an outer projecting portion provided on a radially outward side of the upper surface of the lower plate portion, and said thrust sliding bearing is disposed between the inner projecting portion and the outer projecting portion in the radial direction.

9. The synthetic resin-made sliding bearing according to claim 1, wherein said upper casing further has a through hole located in a center thereof in the radial direction and an inner peripheral side surface defining the through hole, and said upper casing at the inner peripheral side surface thereof defining the through hole is adapted to be immovably fixed in the radial direction to a shaft which is passed through the through hole.

* * * * *